W. PETERS.
DISH DRAINER.
APPLICATION FILED JAN. 18, 1910.

990,454.

Patented Apr. 25, 1911.

Witnesses
F. L. Ourand
E. J. Williams

William Peters
Inventor

By Everett Dufour
Attorney

UNITED STATES PATENT OFFICE.

WILLIAM PETERS, OF BARTOW, FLORIDA.

DISH-DRAINER.

990,454.

Specification of Letters Patent. Patented Apr. 25, 1911.

Application filed January 18, 1910. Serial No. 538,784.

*To all whom it may concern:*

Be it known that I, WILLIAM PETERS, a citizen of the United States, residing at Bartow, in the county of Polk and State of Florida, have invented certain new and useful Improvements in Dish-Drainers, of which the following is a specification.

My invention relates to improvements in what may be termed dish drainers.

As indicated, the invention has for its object to provide for readily, conveniently and quickly draining dishes, and to effect that end in a simple and economical manner.

It consists of certain features or instrumentalities substantially as hereinafter fully disclosed and defined by the claims.

Figure 1:
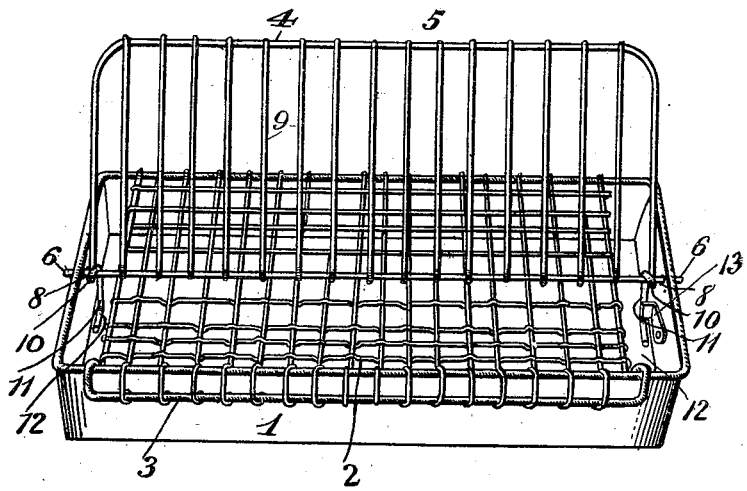
Figure 2:
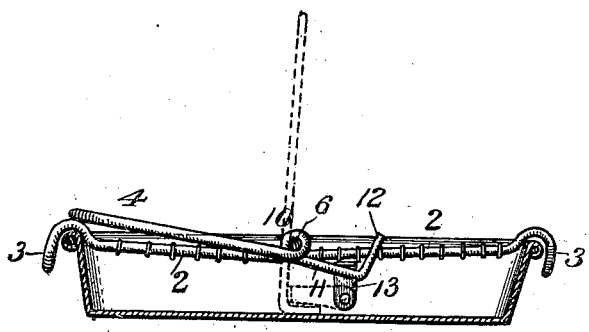

In the accompanying drawing, illustrating the preferred embodiment of my invention, Figure 1 is a perspective view thereof. Fig. 2 is an end elevation of the same showing the upright dish retaining frame-member in horizontal or prone position, as when not in use, with the drip-pan produced in section.

In carrying out my invention, I provide a suitable drip-pan or receptacle 1, preferably rectangular in general outline. Within this pan or receptacle, or rather resting across it, upon its upper edge, is a reticulated frame or holder 2, upon which is supported, or stood edgewise, the dishes for draining after having been cleansed or washed. Said frame or holder has its longitudinal, or what may be considered the forward and rear edges thereof provided with downwardly extending or pendent portions 3 adapted to depend along the corresponding edges of the drip pan or receptacle 1 to retain said frame or holder against casual displacement from said pan. A second frame or support 4 is provided for supporting the dishes edgewise in position above the holder or frame 2, said second frame being arranged to stand edgewise upon the frame or holder 2 about at the middle of the latter, and extending in the longitudinal or axial plane thereof for obtaining the maximum plate-holding capacity of the device. The frame or support 4 is preferably formed of a stout or stiff marginal wire-member 5, of approximately bail-like outline, a right-lined longitudinal stout wire-member 6 having its ends 7 extending through openings 8 in the ends of the receptacle or pan 1, and numerous spaced-apart transverse stiff wires 9 connected at their ends to the longitudinal portion of the wire-member 5 and to the wire-member 6 respectively. The longitudinal wire-member 6 is thus also adapted to serve as an axis upon which the frame or support 4 may be disposed vertically as when in use, or horizontally, as when folded or out of use, as will be observed from Figs. 1 and 2. The lateral portions of the marginal wire member 5 of the frame or support 4, have their inner ends coiled or looped as at 10 around the wire-member 6 and extended beyond the latter as at 11, to form legs, which legs are bent at their free ends at right angles, as at 12, to aid the retention of the frame or support 4 in vertical position, as when in use, said right-angled bent-portions or feet being designed to rest upon the bottom of the pan 1 at that time as is apparent from Fig. 1. A catch 13 is suitably hung upon the inside of the pan or vessel 1, at one end, for engagement with one of the extensions 11 of the lateral portions of the frame 4 for the effective retention of the latter in upright position when thus disposed.

It will be seen that, by springing inwardly one of the lateral portions 10 of the wire member 5 of the frame 4, the wire-member 6 may be moved so as to withdraw a projecting end thereof from its hole in the pan 1 and then be oppositely moved so as to also withdraw the other projecting end thereof from its hole in the pan, thus providing for the removal of the entire draining attachment from the pan or receptacle, which is desirable when it may be desired to clean the latter, also whereby the pan may be used for other purposes. Also it will be observed that, by means of this contrivance or device, it is not required to apply a towel to the dishes for wiping or drying same, as the draining of the adhering water thus provided for, results in the removal of such moisture quite quickly and without requiring personal attention.

I claim—

1. A draining device comprising a receptacle, a frame resting thereon and having its forward and rear ends overhanging the corresponding edges of said receptacle, a rod whose ends are loosely received by holes in said receptacle and adapted to be slid into and out of said holes, and a grilled frame superposed upon the first-referred to frame and having lateral members pivotally connected to said rod and having lower end terminals adapted to rest upon the bottom of said receptacle as the frame is raised to upright position.

2. A dish draining device comprising a receptacle, a reticulated frame resting upon said receptacle, a grilled frame superposed upon said reticulated frame, a pivoting member for said grilled frame, received by said receptacle, a bail shaped marginal member, and numerous wires connected to said bail shaped member and pivoting member, said bail shaped member having its lateral portions coiled around said pivoting and formed legs ending in right angled terminals adapted to rest upon the receptacle bottom, and means for the retention of said grilled frame in upright position when so disposed.

3. A draining device comprising a receptacle, a frame resting upon said receptacle and having its forward and rear edges overhanging the corresponding edges of said receptacle, a rod arranged at about the mid-width of said receptacle and received by holes in the lateral portions of said receptacle and adapted to be slid into and out of said holes, a grilled frame superposed upon the first referred to frame and having lateral members coiled freely around said rod and having lower end right-angled terminals adapted to rest upon the bottom of said receptacle as the frame is elevated to vertical position and means for the retention of said grilled frame in vertical position.

In testimony whereof I affix my signature in presence of two witnesses.

WILLIAM PETERS.

Witnesses:
EPPES TUCKER,
J. A. JOHNSON.

Copies of this patent may be obtained for five cents each, by addressing the "Commissioner of Patents, Washington, D. C."